(12) United States Patent
Nosenzo et al.

(10) Patent No.: US 10,974,446 B2
(45) Date of Patent: Apr. 13, 2021

(54) B-REP OF THE RESULT OF A TWO-AXIS 3D PRINTING PROCESS

(71) Applicant: DASSAULT SYSTEMES, Velizy Villacoublay (FR)

(72) Inventors: Romain Nosenzo, Aix en Provence (FR); Richard Maisonneuve, Aix en Provence (FR); Nicolas Montana, Venelles (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 623 days.

(21) Appl. No.: 15/846,289

(22) Filed: Dec. 19, 2017

(65) Prior Publication Data

US 2018/0178446 A1 Jun. 28, 2018

(30) Foreign Application Priority Data

Dec. 23, 2016 (EP) .................................. 16306813

(51) Int. Cl.
*G06T 17/10* (2006.01)
*B29C 64/393* (2017.01)
(Continued)

(52) U.S. Cl.
CPC .......... *B29C 64/153* (2017.08); *B29C 64/386* (2017.08); *B29C 64/393* (2017.08);
(Continued)

(58) Field of Classification Search
CPC ... B29C 64/153; B29C 64/393; B29C 64/386; B33Y 50/02; B33Y 50/00; G06T 17/10;
(Continued)

(56) References Cited

U.S. PATENT DOCUMENTS

| | | |
|---|---|---|
| 5,596,504 A | 1/1997 | Tata et al. |
| 2003/0210242 A1* | 11/2003 | Kripac .................... G06T 19/20 |
| | | 345/419 |

(Continued)

OTHER PUBLICATIONS

Rypl et al. "Generation of computational surface meshes of STL models" Journal of Computational and Applied Mathematics, vol. 192, pp. 148-151. (Year: 2006).*

(Continued)

*Primary Examiner* — Rehana Perveen
*Assistant Examiner* — Alfred H B Wechselberger
(74) *Attorney, Agent, or Firm* — Oblon, McClelland, Maier & Neustadt, L.L.P.

(57) ABSTRACT

Disclosed is a computer-implemented method for determining a boundary representation of the result of a two-axis 3D printing process. The method comprises obtaining a stack of planes, each couple of consecutive planes corresponding to a respective slice of the result of the 3D printing process. The method also comprises, for each couple of consecutive planes: obtaining one or more respective tool trajectories, determining a respective 2D contour corresponding to the one or more tool trajectories. The method also comprises determining a respective extrusion of the respective 2D contour bounded by a second plane of the couple and a first plane of the couple, and forming the boundary representation with the extrusions and portions of the planes. The method improves 3D printing.

14 Claims, 11 Drawing Sheets

(51) Int. Cl.
*G06F 30/00* (2020.01)
*B29C 64/386* (2017.01)
*G06F 119/18* (2020.01)
*B33Y 50/02* (2015.01)
*B29C 64/153* (2017.01)

(52) U.S. Cl.
CPC .............. *B33Y 50/02* (2014.12); *G06F 30/00* (2020.01); *G06T 17/10* (2013.01); *G06F 2119/18* (2020.01); *Y02P 90/02* (2015.11)

(58) Field of Classification Search
CPC ........ Y02P 90/265; G06F 30/17; G06F 30/00; G06F 2119/18
See application file for complete search history.

(56) References Cited

U.S. PATENT DOCUMENTS

| | | | |
|---|---|---|---|
| 2008/0004745 A1* | 1/2008 | Nasu | G05B 19/4097 700/182 |
| 2012/0299917 A1* | 11/2012 | Kumar | B33Y 50/00 345/420 |
| 2015/0269281 A1 | 9/2015 | Nelaturi et al. | |
| 2015/0269282 A1* | 9/2015 | Nelaturi | G06F 30/17 700/98 |
| 2016/0052087 A1* | 2/2016 | O'Neill | B29C 64/393 419/7 |
| 2016/0221262 A1 | 8/2016 | Das et al. | |
| 2016/0232259 A1* | 8/2016 | Williams | G06F 30/00 |
| 2017/0372480 A1* | 12/2017 | Anand | G06T 19/20 |
| 2018/0365889 A1* | 12/2018 | Bisson | G06T 17/00 |

OTHER PUBLICATIONS

Taufik et al. "Computer Aided Visualization Tool for Part Quality Analysis of Additive Manufacturing Process" DETC2016-60019, V02AT03A034, Apr. 2016 [retrieved on Jul. 15, 2020]. Retrieved from <https://asmedigitalcollection.asme.org/IDETC-CIE/proceedings/IDETC-CIE2016/50107/V02AT03A034/258410> (Year: 2016).*

Biswas et al. "Layer the sphere" Vis Comput, vol. 31, pp. 787-797 [retrieved on Jul. 20, 2020]. Retrieved from <https://link.springer.com/article/10.1007/s00371-015-1101-3> (Year: 2015).*

Kumar et al. "Rapid Product Development using Virtual Prototyping Technologies" Flexible Automation and Intelligent Manufacturing, FAIM2008, Skovde, Sweden, pp. 145-154 [retrieved on Jul. 15, 2020]. Retrieved from <https://www.diva-portal.org/smash/get/diva2:627633/FULLTEXT01.pdf#page=165> (Year: 2008).*

European Search Report dated Jul. 4, 2017 in European Application No. 16306813.3-1954.

Lee, In-Kwon et al., "Planar curve offset based on circle approximation", Elsevier, Computer-Aided Design, vol. 28, pp. 617-630 (1996).

Nelaturi, Saigopal et al., "Representation and analysis of additively manufactured parts", Computer Aided Design, 2015 vol. 67, pp. 13-23, DOI: 10.1016/J.CAD.2015.03.007.

Pandy, P.M. et al., "Slicing procedures in layered manufacturing: a review", Rapid Prototyping Journal, vol. 9, No. 5, pp. 274-288 (2003).

Rypl, D et al. "Generation of computational surface meshes of STL models", Journal of Computational and Applied Mathematics, vol. 192, No. 1, Jul. 15, 2006, pp. 148-151.

Liu, Xu-Zheng et al., "An o☐set algorithm for polyline curves", Computers in Industry, Elsevier, 2007, 15p. <inria-00518005>.

Office Action dated Dec. 31, 2020 in China Patent Application No. 201711400968.3 (with English translation); 16 pgs.

* cited by examiner $S = 2DSweep(T, r)$     $C = Clean(S)$

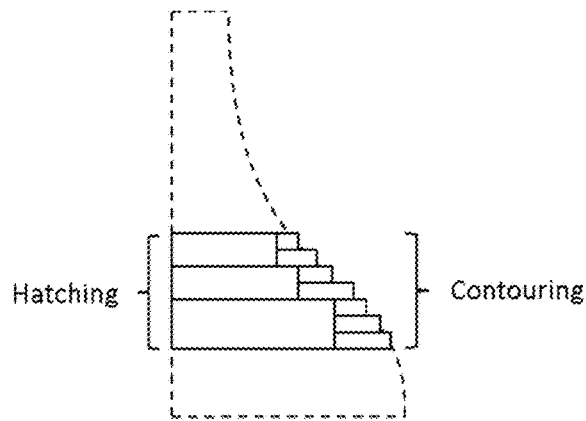
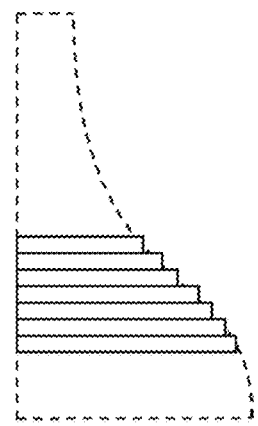
FIG. 30  FIG. 31
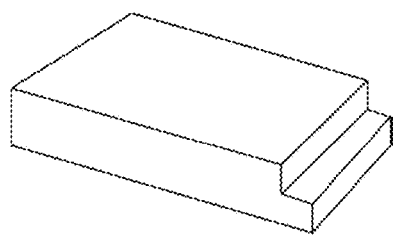
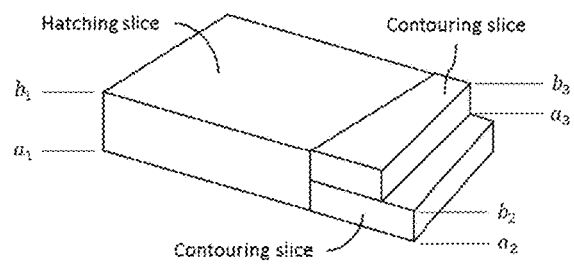
FIG. 32  FIG. 33
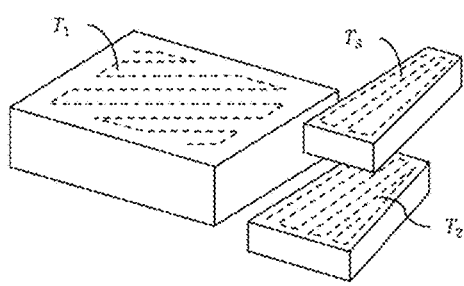
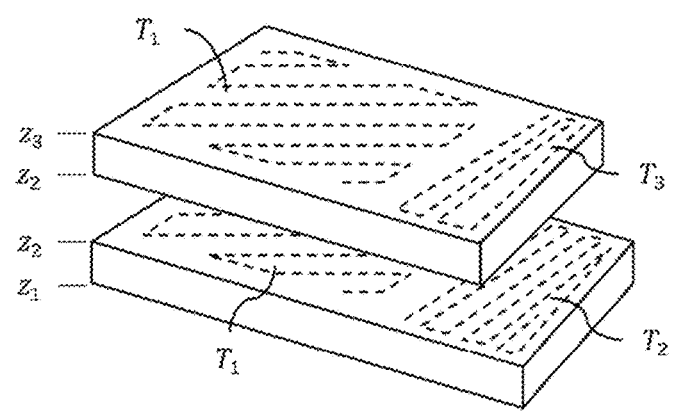
FIG. 34  FIG. 35

US 10,974,446 B2

B-REP OF THE RESULT OF A TWO-AXIS 3D PRINTING PROCESS

CROSS-REFERENCE TO RELATED APPLICATIONS

This application claims priority under 35 U.S.C. § 119 or 365 to European Application No. 16306813.3, filed Dec. 23, 2016. The entire contents of the above application(s) are incorporated herein by reference.

FIELD OF THE INVENTION

The invention relates to the field of computer programs and systems, and more specifically to a method, system and program for determining a boundary representation (B-Rep) of the result of a two-axis 3D printing process and/or for comparing the B-Rep to a 3D modeled object representation of a reference (manufacturing) product, for example a target part.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Three-dimensional (3D) printing can make use of these systems and programs. 3D printing, also known as additive manufacturing, refers to various processes used to synthesize a real object. In 3D printing, successive layers of material are formed under computer control to create said real object.

Within this context, there is a need to improve 3D printing.

SUMMARY OF THE INVENTION

It is therefore provided a computer-implemented method for determining a B-Rep of the result of a two-axis 3D printing process. The method comprises providing a stack of planes. Each couple of consecutive planes corresponds to a respective slice of the result of the 3D printing process. The method also comprises a scheme performed for each couple of consecutive planes. The scheme comprises providing one or more respective tool trajectories. The scheme also comprises determining a respective 2D contour corresponding to the one or more tool trajectories. The scheme also comprises determining a respective extrusion of the respective 2D contour bounded by a second plane of the couple and a first plane of the couple. The method also comprises forming the B-Rep with the extrusions and portions of the planes.

The method may comprise one or more of the following:
the portions of the planes that form the B-Rep comprise, for each plane which is the second plane of a first couple of consecutive planes and the first plane of a second couple of consecutive planes, faces that each correspond to a respective region of the plane which is outside the 2D contour respective to the first couple and inside the 2D contour respective to the second couple, or which is inside the 2D contour respective to the first couple and outside the 2D contour respective to the second couple;
each face that corresponds to a respective region of the plane which is inside the 2D contour respective to the first couple and outside the 2D contour respective to the second couple is set with an outer vector in a direction of the stack of planes, and each face that corresponds to a respective region of the plane which is outside the 2D contour respective to the first couple and inside the 2D contour respective to the second couple is set with an outer vector in a direction opposite to the direction of the stack of planes;
providing the stack of planes comprises providing a sequence of tool trajectories and for each tool trajectory a respective pair of layer limits, and determining the stack of planes from the sequence of tool trajectories and layer limits; and/or
determining the stack of planes comprises determining a set of all plane limits from the layer limits, sorting the set of all plane limits into a strictly progressive list.

It is further provided a data structure comprising a B-Rep obtainable by the method.

It is further provided a process comprising providing the data structure, for example by performing the method, and then performing any one or any combination of the following:
the method further comprises an analysis of the B-Rep formed with the extrusions and the portions of the planes;
the method comprises, prior to the providing of the stack of planes, providing a 3D modeled object representing a reference product, the stack of planes and the one or more tool trajectories respective to each couple of consecutive planes being provided based on the 3D modeled object representing the reference product, the analysis comprising a comparison between the B-Rep formed with the extrusions and the portions of the planes and the B-Rep of a reference product representing the reference product;
the analysis comprises a micro-crack and/or clash detection and/or a physical analysis;
the method further comprises performing one or more B-Rep design operations on the B-Rep formed with the extrusions and the portions of the planes;
the method further comprises a real-time displaying and/or a streaming of the B-Rep formed with the extrusions and the portions of the planes; and/or the method further comprises adding to the B-Rep formed with the extrusions and the portions of the planes one or more attributes related to the two-axis 3D printing process.

It is further provided a data structure comprising a B-Rep obtainable by the process.

It is further provided a manufacturing method or pipeline comprising providing the data structure obtainable by the method and/or the process, for example by performing the method and/or the process, and then applying the two-axis 3D printing process to manufacture a product represented by the B-Rep. The manufacturing pipeline may comprise several instances of the method, including rejection(s) and/or validation(s) of two-axis 3D printing process instance(s), and then applying a validated two-axis 3D printing process instance.

It is further provided a computer program comprising instructions for performing the method, the process, and/or control of the manufacturing pipeline.

It is further provided a computer readable storage medium having recorded thereon the computer program and/or the data structure(s).

It is further provided a system comprising a processor coupled to a memory comprising the data storage medium.

BRIEF DESCRIPTION OF THE DRAWINGS

Embodiments of the invention will now be described, by way of non-limiting example, and in reference to the accompanying drawings, where:

FIGS. 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45 and 46 illustrate the method.

DETAILED DESCRIPTION OF THE INVENTION

Figure 1:
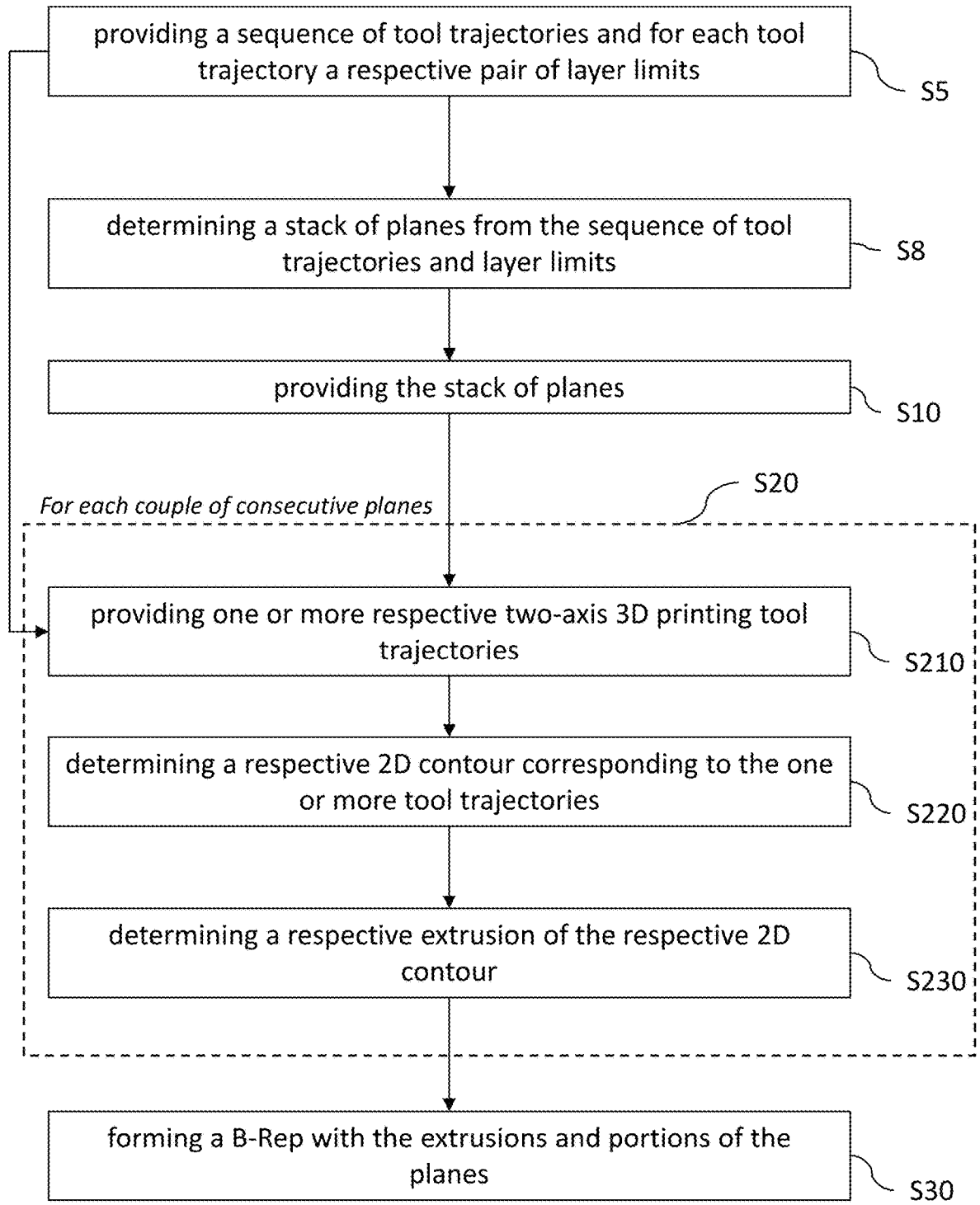
FIG. 1 shows a flowchart of an example of the method.

With reference to the flowchart of FIG. 1, it is proposed a computer-implemented method for determining a B-Rep of the result of a 3D printing process.

The boundary representation or B-Rep is a widely known format for modeling a 3D object in terms of its boundary or yet envelop or skin (i.e. its outer surface(s)). The B-Rep thus designates data of a specific format that may comprise geometrical data and topological data. Geometrical data are data that provide geometrical entities, which are entities described in terms of 3D positions. Topological data are data that provide topological entities, which are entities described in terms of references to geometrical entities and/or relationships with other topological entities, e.g. relative positioning and adjacency relation. Typically, the relationships may include an "is bounded by" relationship that associates a topological entity to other topological entities by which it is topologically bounded. The B-Rep format is described in more details for example in document EP 2 808 810 A1.

The method of FIG. 1 thereby simulates a 3D printing process, by outputting a representation of the boundary (i.e. envelop) of the result of such a 3D printing process. The outputted boundary may be displayed, e.g. to a user or to a team who can thereby visualize the physical shape of the result of such a 3D printing process, and/or inputted to any process (manual, automatic or yet semi-automatic) based on an boundary representation of a solid (optionally based on the B-Rep format) to perform any manipulation, including analysis, reworking, validation, and/or functioning simulation.

The method of FIG. 1 may also be included in a manufacturing process, which may comprise, after performing the method (e.g. several instances of the method), producing a physical product. The production may comprise an execution of the 3D printing process (e.g. an underlying one of the instances of the method, e.g. the last instance). The physical product may be a (e.g. mechanical) part.

The B-Rep determined by the method of FIG. 1 represents the result of a two-axis 3D printing process in specific. The expression "two-axis 3D printing process" is widely known as designating any additive manufacturing process with a 3D printing tool operating along a two-axis toolpath, e.g. powder bed 3D printing where the tool is a laser which solidifies powder, optionally using a mirror, stereo-lithography with a UV ray emitter which solidifies resin, or direct deposit 3D printing where the tool is a nozzle outputting material. In the context of a laser, the laser beam may be of a fixed direction and orthogonal to the surface of the powder bed (e.g. vertical from the top to the bottom).

A two-axis 3D printing process may build up a product along a printing direction, which may be straight and for example a vertical direction (e.g. from the bottom to the top). The process may comprise stacking up material layers. A material layer (or simply layer) is here defined as a monolithic piece of material of a constant thickness formed along a continuous path of the 3D printing tool (where the tool is kept switched on). The path for forming a given layer is defined in 2D, in a plane orthogonal to the printing direction, such that the given layer is also orthogonal to the printing direction. Each stack is along the printing direction. In the context of a laser, the printing direction is opposite to the laser beam direction.

The layers may have different thicknesses. Also, different layers may be located at a same height, but at different horizontal positions. A two-axis 3D printed product may comprise a set of stacks of layers connected altogether, for example by layers shared across different stacks, so that the product forms a monolithic solid. A 3D printed product may have a number of layers superior to 100, 200, 500 or 1000, or yet 10.000.

The specifications of a two-axis 3D printing process may comprise a sequence of tool trajectories and for each tool trajectory a respective pair of layer limits. A tool trajectory is a continuous path to form a layer or a subset thereof. A tool trajectory may thus be defined as a 2D trajectory. A pair of layer limits corresponds to the two heights of a layer, and the two layers limits are thus each constant values for a given layer. The pair of layer limits may correspond to a parameter of the 3D printing along the respective trajectory, for example a laser power value which in turn defines a value of fusion depth. A trajectory may correspond to a largest elementary straight path of the 3D printing tool within the whole process, or to the whole path of the 3D printing tool corresponding to the formation of a whole layer.

The method of FIG. 1 comprises providing at S5 such specifications. The method of FIG. 1 then determines at S8 a stack of planes from these specifications. The stack of planes provided at S10 may be any data representative of a stacking of material, e.g. a list of thicknesses or a list of consecutive height couples (e.g. with respect to a support/ reference plane associated to the zero height). The stack of planes is thus naturally ordered, e.g. from the bottom to the top (or inversely). The term "consecutive" refers to two immediate neighbors along the natural order of the stack of planes. The planes of the stack of planes may be parallel. Each plane may be infinite (i.e. unbounded planar surface).

The stack of planes may comprise a bottom reference plane associated with the zero height, the other planes being associated to a non-zero (e.g. positive) height. Any 2D geometry in a given plane may be defined in the reference plane and a pointer to the given plane. The system may interpret such definition as meaning that the 2D geometry is to be vertically projected to the pointed plane. Similarly, any extrusion (resp. a tool trajectory that corresponds to the formation of material) between two given planes may be defined as a 2D geometry in the reference plane, a pointer to the two given planes, and information that an extrusion (resp. a tool trajectory) is contemplated. The system may interpret such definition as meaning that the 2D geometry is to be extruded vertically (resp. that material is to be formed along the trajectory) between the two pointed planes.

By construction of the stack of planes, each couple (i.e. ordered pair) of consecutive planes corresponds to a respective slice of the result of the 3D printing process. The expression "slice" refers to a slice of material and designates the subset made of all the material of the 3D printed product bounded by two consecutive planes and having a constant thickness (e.g. at least substantially). In other words, in the (strict) interior of a slice the product does not feature any horizontal outer surface. Any horizontal outer surface must therefore match a provided plane of the stack. The subset in a slice is not necessarily monolithic. Also, a slice does not necessarily match a layer, as a slice encompasses all material between two consecutive planes, such that different layers (e.g. having different thicknesses) may intersect a same slice. In other words, a slice may comprise material of different layers and horizontally cross a layer. The number of slices may be inferior to the number of layers. This improves efficiency. The number of planes of the stack of planes may for example be equal to the number of different layer limit values.

The determining S8 may for example comprise determining a set of all plane limits from the layer limits. For example, all layer limits provided at S5 are considered as a set, duplicates may optionally be deleted, and the result may be interpreted as the set of plane limits. The determining S8 may then comprise sorting the set of all plane limits into a strictly progressive list. The term "progressive" means that the limits progress in a same direction. "Strictly" means that there cannot be two same limits in the list. In case the limits are provided as values, for example heights, this means that the list of heights is strictly increasing (resp. strictly decreasing, depending on the selected reference, i.e. the zero height). This ensures a minimal number of plane limits and thereby improves efficiency of the whole algorithm.

In examples, the method may follow the provision of a reference 3D modeled object representing a reference product, for example as a B-Rep. The specifications provided at S5 may be determined based on the reference 3D modeled object, e.g. by a user or a team or automatically or semi-automatically, in any known way. Existing solutions to determine such specifications based on a reference 3D modeled object are provided for example by CAM solutions such as DELMIA (registered trademark). The distance between layer limits may depend on the type of printing performed (hatching or contouring, discussed hereunder), which itself depends on the laser power and thus on the depth of fusion material. For example, the user or team or an algorithm may determine a stack of planes corresponding to the B-Rep, and then a first algorithm may compute the intersection between the reference 3D modeled object and a given plane. The result provides one or more cycles called "contouring". A second algorithm may then "hatch" each contouring to produce a set of parallel segments included in the contouring and having a constant distance between them, which depends once again on the laser power. "Contouring" and "hatching" concepts are discussed later. Examples of this process are also provided in paper "*Slicing procedures in layered manufacturing: a review*" by Pulak Mohan Pandey, N. Venkata Reddy and Sanjay G. Dhande.

Alternatively, the stack of planes may be provided at S10 as such, for example received from another user.

The method then comprises a scheme S20 performed for each couple of consecutive planes of the stack.

Scheme S20 comprises providing S210 one or more respective tool trajectories. The tool trajectories may stem directly from the specifications provided at S5 if any. In other words, for each given pair of layer limits encompassing the two planes of a given slice, the tool trajectory provided at S5 for the given pair is also provided at 210 for the given slice. In the alternative where S5 is not implemented, these tool trajectories may be provided as such, for example also received from another user. The planes provided at S10 and the tool trajectories provided at S210 correspond to the fact that the product features material between two consecutive planes of a given couple at all locations encountered by the tool when following the tool trajectories provided for that given couple.

Scheme S20 also comprises determining S220 a respective 2D contour corresponding to (the union of) the one or more tool trajectories that correspond to the couple of consecutive planes. A 2D contour is the boundary of a 2D geometry. In the present case, the union of the one or more trajectories provided at S210 for the considered couple of consecutive planes defines a subset of the slice (defined by the couple of consecutive planes) that intersects the final 3D printed product. The 2D contour determined for that slice may be the 2D transverse section of the contour of the intersection. The 2D contour determined at S220 may be determined based on the one or more trajectories provided at S210, by considering a union of the trajectories. Examples are provided later.

Scheme S20 also comprises determining S230 a respective extrusion of the respective 2D contour. The respective extrusion is bounded by a second plane of the couple and a first plane of the couple. The extrusion is determined as a B-Rep portion using classical algorithms. The method also comprises forming S30 the B-Rep with the extrusions and portions of the planes. In other words, the extrusions determined at all iterations of S230 are sewn together using adequate portions of the planes, which are also defined as B-Rep portions, the result thus forming a B-Rep (e.g. after a final closure at the bottom and/or at the top of the resulting set of sewn extrusions, so that the B-Rep correctly forms a closed surface). The portions of the planes used at S30 are those that join the top of a given extrusion to the bottom of a next extrusion (in the upper direction). Examples of determining such portions are provided later. The forming S30 may consist after such determining of a topological graph rewriting (e.g. consisting of logical operations, e.g.

excluding any geometrical operation). Examples are provided later.

Such a method improves the field of 3D printing.

Notably, the method outputs at S30 computerized data representing the result of a two-axis 3D printing process. Such computerized data may then be processed in any way required by the 3D printing context. Thanks to the B-Rep format, such post-processing can be relatively efficient. The B-Rep format indeed provides a relatively high compacity of information while also providing a relatively high level of details. Also, the B-Rep format provides most relevant information, namely the boundary of a solid, as compared to other types of representation such as unstructured representations. Furthermore, the B-Rep is standardized in most industrial design software solutions, such that in many industrial contexts it has become a requirement to output a B-Rep model (in which case the method of FIG. 1 allows reaching the result in a fast and robust manner).

Furthermore, the B-Rep formed at S30 by the method of FIG. 1 is obtained particularly efficiently thanks to the determining S230 of extrusions of 2D contours. Determination S230 can be performed using little computer resource. Notably, S230 may be performed excluding any solid Boolean operation. Solid Boolean operations are time-consuming. On the other hand, the method of FIG. 1 builds 3D with extrusions of 2D contours, which can be performed particularly fast. Also, the method of FIG. 1 may exclude any collision test, configuration diagnosis, surface/surface intersection, topology solving, and/or user-intervention. The method of FIG. 1 can thus be performed fast.

The method of FIG. 1 thereby differs from traditional algorithms for Boolean operations (union, intersection, subtraction) of a CAD system which are designed for general purpose. Such traditional Boolean operation algorithms must take into account arbitrary input solids featuring arbitrary shapes in arbitrary positions, and particularly interpenetrating solids featuring free-form surfaces. For this purpose, these algorithms perform collision tests, costly configuration diagnoses, complex surface/surface intersections and topology solving. In addition, they are used for designing a solid part under user-control. The user performs each design operation one after the other and checks intermediate results. This way, incorrect results or failures are managed on the fly.

Such issues of traditional algorithms for Boolean operations are now discussed with reference to FIGS. 2-3.

Figure 2:
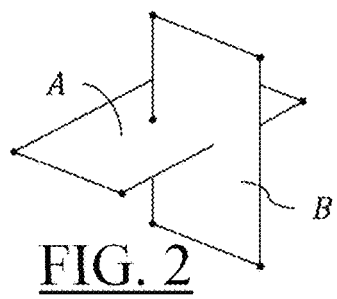
FIGS. 2 and 3 illustrate issues of traditional Boolean operations.
Figure 3:
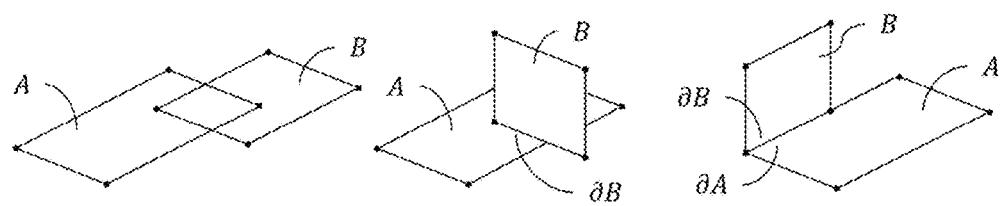

Respectively noting A and B a face of the first input solid and a face of the second input solid, the most comfortable configuration for a Boolean operation algorithm is to have two transverse faces, as illustrated in FIG. 2. Conversely, the most difficult configurations are the following. Faces A and B are coplanar, the boundary curve ∂B of face B is included in the support plane of face A, a portion of the boundary curve ∂A of face A is coincident with a portion of the boundary curve ∂B of face B. FIG. 3 illustrates such difficult configurations, respectively from the left to the right. If applied to 3D printing simulation, general purpose 3D algorithms would feature computing times that are not compatible with user-expectation. Furthermore, reliability problems may arise due to the very large number of Boolean operations to perform. This is because, in this very special context, only difficult configurations would be given to the 3D algorithm. Noting n the number of layers, at least n−1 unions would be necessary, and a typical value for n is several thousands. This order of magnitude is far beyond the nominal use of traditional Boolean operations in the context of mechanical design: a few hundreds. Finally, all operations would be performed out of the user's visual control, making the process even more fragile. In conclusion, traditional algorithms for Boolean operations are not adapted for determining a B-Rep of the result of a two-axis 3D printing process.

On the other hand the method of FIG. 1 implements a version of the union algorithm dedicated to combine planar slices of material (represented by thin solids) one on the top of another, taking into account that slices are glued together without interpenetration. Thanks to this very special situation, the 2D algorithm implemented by the method of FIG. 1 achieves results similar (in shape) to those achievable by a general purpose 3D algorithm, but in a much faster way. This is notably because, in examples of the method of FIG. 1, geometrical and topological computations are mainly performed with closed curves in a working plane that is parallel to all slices. The 2D oriented technology of the method of FIG. 1 makes the algorithm much simpler than a general purpose 3D algorithm. Despite the 3D printing simulation only features difficult configurations, they can be anticipated all the time, thus avoiding costly diagnosis. Consequently, the 2D algorithm is much faster and it is robust enough to handle industrial cases within a computing time that is compliant with user-expectation.

The method of FIG. 1 can be implemented within any one or any combination of the following application processes (e.g. the output of the method of FIG. 1 and/or of any one or more step(s) of the method of FIG. 1 being provided as an input for the following, or alternatively the method comprising the following as further step(s)):

1) The B-Rep formed at S30 may be analyzed by a user or a team. For example, the user or team contemplates manufacturing one or more products according to a candidate two-axis 3D printing process. The method of FIG. 1 may then be performed to output the result of the candidate two-axis 3D printing process. The result may then be analyzed, thereby allowing virtual assessment of the candidate two-axis 3D printing process. Based on the result of the analysis, the user or system may undertake any action. For example, upon a criterion being met (resp. not met) the candidate two-axis 3D printing process may be validated (resp. rejected). By "validating" (resp. "rejecting"), it is meant that the candidate two-axis 3D printing process is considered as a suitable (resp. an unsuitable) manufacturing process. The method of FIG. 1 thereby provides a step toward a solution to efficiently and virtually test a candidate two-axis 3D printing process, e.g. thus providing a framework for designing a two-axis 3D printing process.

The analysis may for example comprise any one or any combination of the following examples:

a. The analysis may comprise a comparison to a 3D modeled object representation of a reference (manufacturing) product. For example, the user or team contemplates manufacturing a reference product represented by a provided reference 3D modeled object. The reference 3D modeled object may have been designed using a CAD software or any software integrating such design functionality, for example previously, for example by another user or team (but not necessarily). The user or team may determine (e.g. by a guess or hypothesis or any appropriate method) a hypothetical two-axis 3D printing process (corresponding to tool trajectories as explained later), that is a two-axis 3D printing process thought to result in the reference product. The method of FIG. 1 may then be performed to output the result of the hypothetical two-axis 3D printing process. The result may then be compared to the reference 3D modeled object, thereby allowing virtual assessment of the hypothetical two-axis 3D printing process. The comparison may be performed in any way, for example automatically by an algorithm or visually by a user. In examples the comparison may comprise or consist of a distance analysis. A distance analysis between two 3D models is an assessment of the geometric deviation (e.g. map of geometrical deviation between the two objects) between the two 3D models. An automatic distance analysis comparison may be performed to compute the material difference between the reference 3D modeled object and the output B-Rep, for example simply by applying a—e.g. symmetric—Boolean difference (e.g. $(A\backslash B)\cup(B\backslash A)$, based on the traditional Boolean subtraction and union) or an approximation of the Hausdorf distance (e.g. sampling of B with points and for each sample point computation of minimal distance to A). A visual comparison (distance analysis or any other comparison) may be performed such as described in European application No. 15306705.3 filed on 25 Oct. 2015, and more generally is, by displaying the two objects simultaneously, for example superposed in a same scene, and upon manipulation of a user-interaction tool controlling the rendering of both objects. The 3D representation of the target product may be a B-Rep itself. In such cases, the comparison may be performed particularly fast. For example, if the distance analysis leads to a geometric deviation (between the referenced 3D modeled object and the output of the method of FIG. 1) above (resp. below) a predetermined threshold, the hypothetical two-axis 3D printing process may be rejected (resp. validated).

b. The analysis may comprise any search for any default in the B-Rep formed at S30. For example, the analysis may comprise a micro-crack detection and/or a clash detection. Such well-known analysis of 3D models representing product boundaries can be performed particularly efficiently with a B-Rep.

c. The analysis may comprise a physical analysis, for example an analysis of the behavior of the real object represented by the B-Rep formed at S30 under a physical phenomenon. Such well-known analysis of 3D models representing product boundaries can be performed particularly efficiently with a B-Rep.

d. The analysis may comprise computing the surface to be painted. Such analysis can be performed particularly efficiently with a B-Rep.

e. The analysis may comprise a use of the fact that a B-Rep is a closed surface, for example to identify an interior or an exterior of the output of the method of FIG. 1.

2) The B-Rep formed at S30 may be reworked by a user or a team. The reworking may correspond to simplification of the B-Rep formed at S30 and/or to further manufacturing step(s), such as machining and/or assembling step(s) as an example. Such reworking may be performed by using the B-Rep as an input to any algorithm or software based on the B-Rep format (thus configured to perform B-Rep design operations). This concerns most solutions related to the machining context, as these solutions require a closed surface representation of products, which the B-Rep format provides. This can include material removal simulation and/or model simplification.

3) The B-Rep formed at S30 may be displayed real-time (e.g. substantially). In other words, as the algorithm of FIG. 1 is performed, and notably as each extrusion determination S230, the respective extrusion and the corresponding plane portion(s) may be displayed substantially real-time. Optionally, each extrusion process may displayed, thereby displaying a continuous stretch of solid skin as an extrusion is formed. In examples, the couples of consecutive planes are ordered according to the sequence followed by the two-axis 3D printing process (i.e. from the bottom to the top). In such a case, scheme S20 may be performed according to a sequence corresponding to such order. In such a case, the real-time displaying substantially amounts to a visual simulation of the printing process. In other words, the method of FIG. 1 may allow providing to a user with a real-time visualization of the stock during the 3D printing process.

4) The B-Rep formed at S30 may be streamed, for example sent as a streaming to another system, for example real-time (i.e. as it is formed) or afterwards. The layer-by-layer format of the B-Rep allows the real-time displaying as the B-Rep is streamed, according to the displaying characteristics explained above with reference to application 3), without data loss and without needing any re-computation.

5) One or more attributes related to the two-axis 3D printing process may be added to the B-Rep formed at S30. The attributes may comprise any of the data outputted by the analyses performed in application 1), and/or descriptors of material used in the printing process, of laser power and/or of fabrication time. Such attributes may be associated to faces of the B-Rep in a layer-by-layer way (i.e. faces corresponding to a same layer being associated with a same descriptor value). The attributes may comprise descriptors of material transition used in the printing process, e.g. associated to face-separating edges in a layer-transition-by-layer-transition way (i.e. edges corresponding to a same layer transition being associated with a same descriptor value). The attributes may comprise or any other manufacturing information such as slice number, e.g. associated to the B-Rep as a whole. The layer-by-layer framework implemented by the method of FIG. 1 allows to describe such 3D-printing-related characteristics of the product represented by the B-Rep is a natural way. The attributes may then allow a user querying a database of B-Reps with one or more criteria involving one or more such attributes.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects (the B-Rep formed at S30 being one such modeled object). A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

A modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The B-Rep formed at S30 may represent the geometry of a product to be manufactured in the real world subsequent to the completion of its virtual design with for instance a CAD software solution or CAD system, such as a (e.g. mechanical) part. The method of FIG. 1 may be applied several times to design an assembly of several parts each represented by a respective B-Rep formed at a respective instance of S30. A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle, a part of an aerial vehicle, a part of a naval vehicle, a general mechanical part, an electro-mechanical or electronic part, a consumer good, a packaging.

Figure 4:
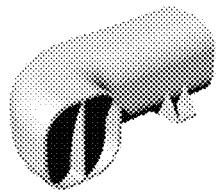
FIGS. 4, 5, 6, 7, 8 and 9 show examples of B-Reps that may be formed by the method.
Figure 5:
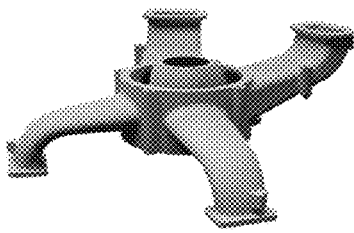
Figure 6:
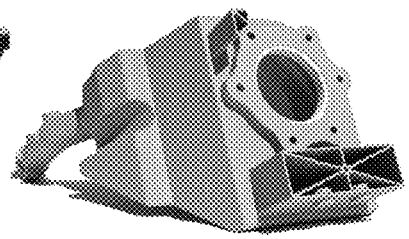
Figure 7:
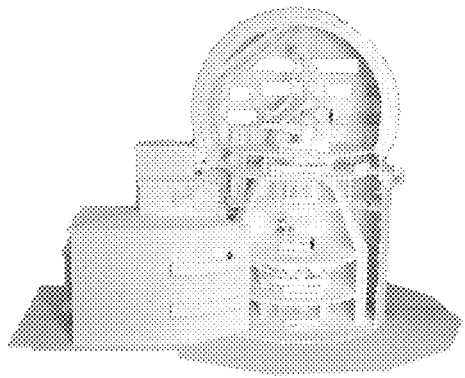
Figure 8:
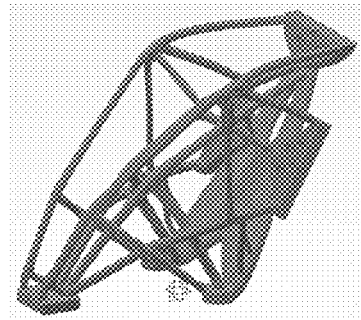
Figure 9:
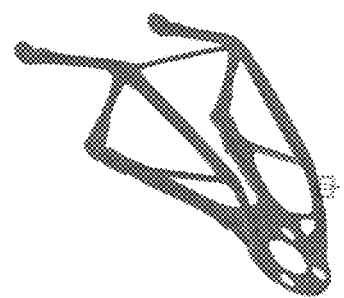

Examples of B-Reps that may be formed at S30 are shown on FIGS. 4-9. It should be noticed that all parts are made of a single piece of material despite they feature complex topologies. FIGS. 4-6 show typical ducts and tanks. FIG. 7 shows the mockup of an industrial building. FIGS. 8-9 show aerospace parts (actually obtained by an implementation test of the method of FIG. 1).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled object into elements which physical behaviors can be computed and simulated through equations. Such CAE solutions are provided by Dassault Systèmes under the trademark SIMULIA®. Another growing CAE technique involves the modeling and analysis of complex systems composed a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 10:
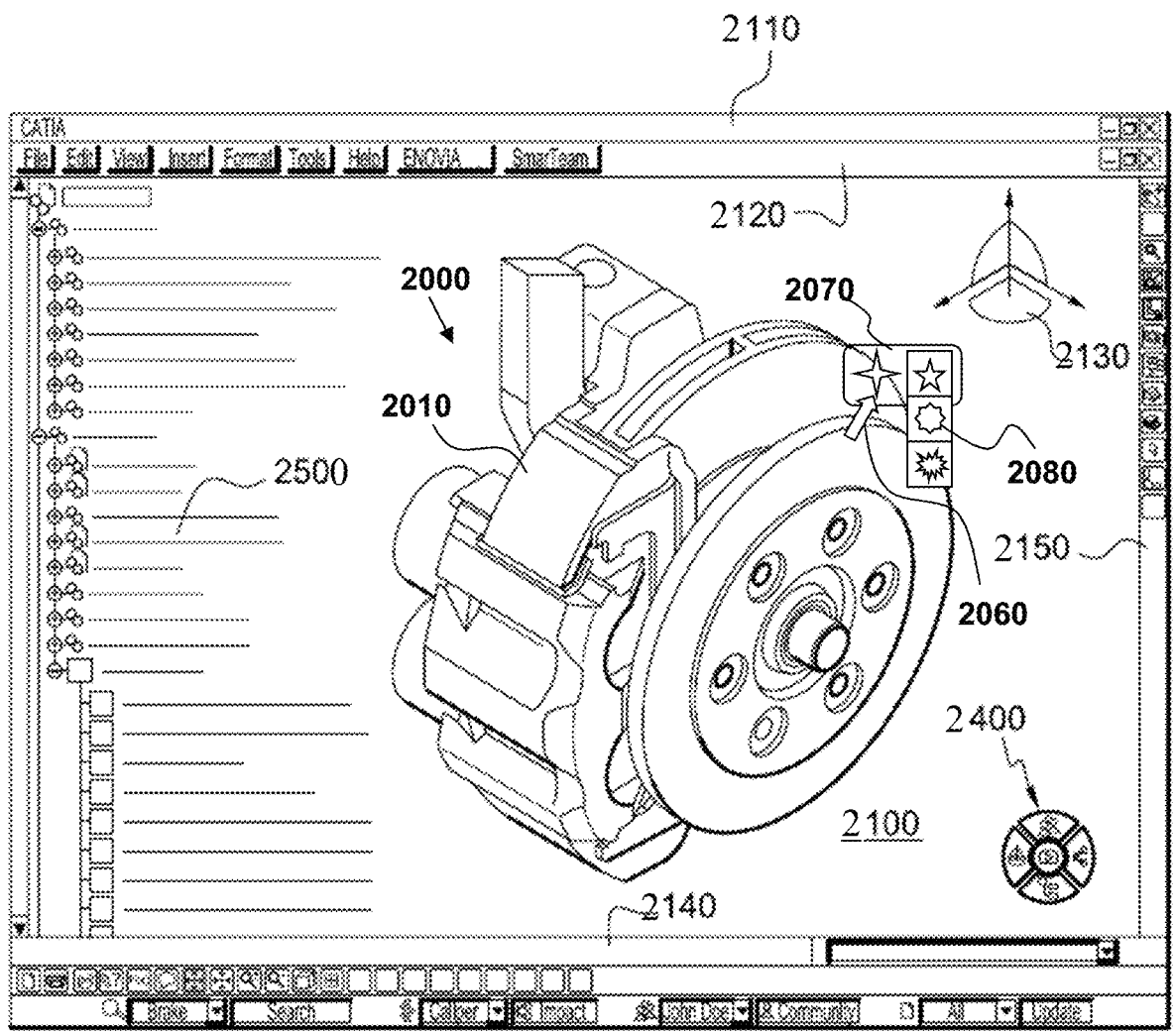
FIG. 10 shows an example of a graphical user interface of the system.

FIG. 10 shows an example of the GUI of the system, wherein the system is a CAD system.

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100, which may be or comprise B-Rep formed at S30. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 11:
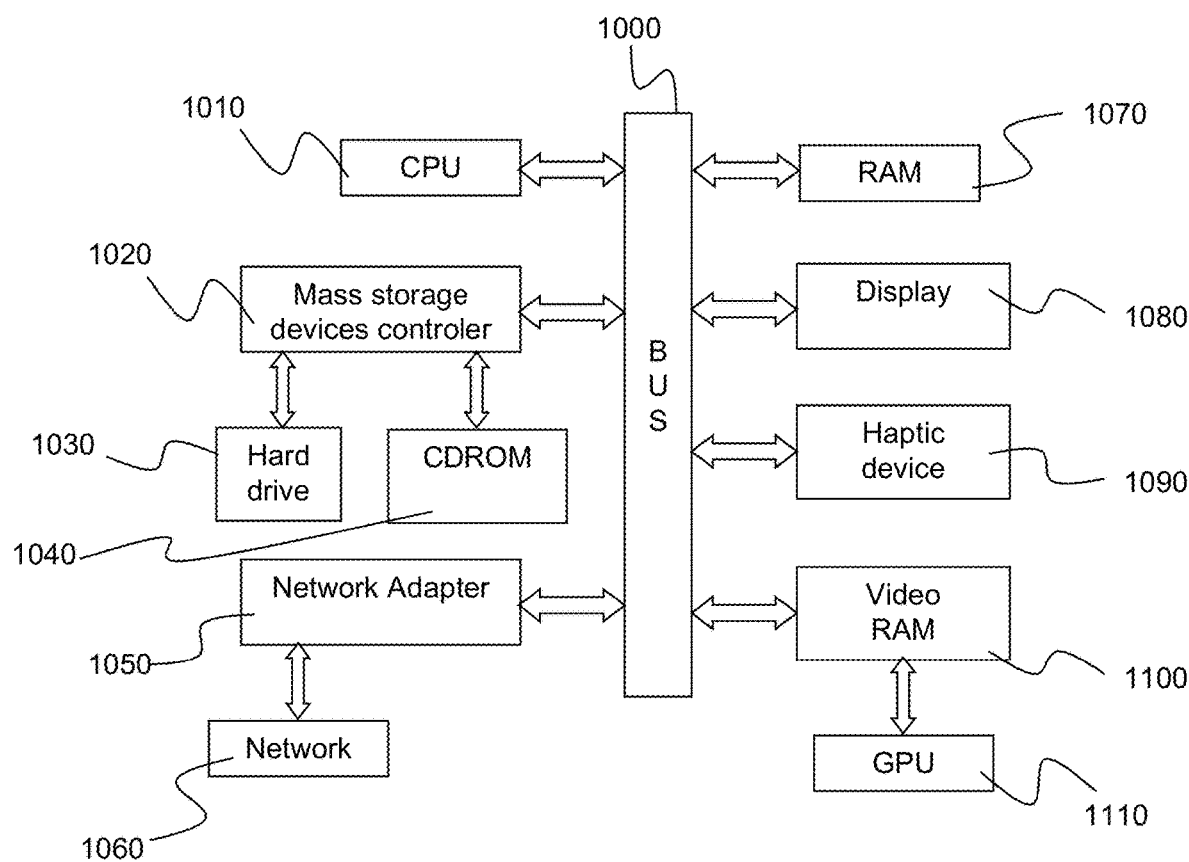
FIG. 11 shows an example of the system.

FIG. 11 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Examples of the powder bed 3D printing process which can be simulated by the method of FIG. 1 are now discussed with reference to FIGS. 12-15.

Solid material creation is performed by driving a laser, from a source and a reflecting mirror, on top of a flat powder layer. Fusion occurring at the point where the laser hits the powder instantaneously changes the powder into solid material. The fusion depth d and the fusion radius r are constant along each trajectory. Nevertheless, parameters d and r are governed by the laser's intensity, which may change from one trajectory to the other. The powder bed is a rectangular volume the depth of which is increased step by step by moving down a piston and by powder refill.

Thus, the overall process is to repeat the sequence:
1. Move down the piston according to distance d.
2. Add a new thin powder layer of thickness d.
3. Adjust the laser's intensity and drive the laser's trajectory on top of this new layer, which solidifies a powder sub-volume of thickness d or more.
4. Go to step 1.

Figure 12:
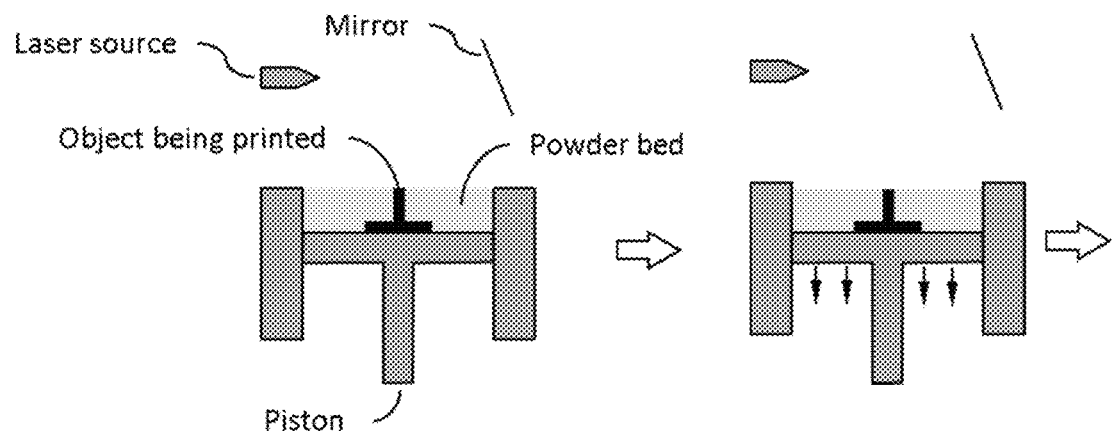
Figure 13:
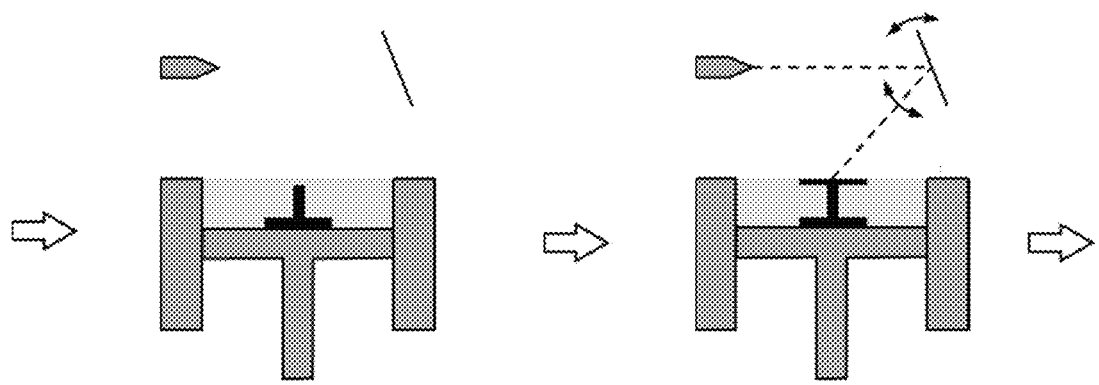

Left drawing of FIG. 12 illustrates the end of previous layer printing. The laser is "off". Right drawing of FIG. 12 illustrates the empty volume left on top of the powder bed by moving the piston down, which is step one of the iteration. Left drawing of FIG. 13 illustrates the layer of fresh powder on top of the powder bed, which is step two of the iteration. Right drawing of FIG. 13 illustrates the printing of the current powder layer, which is step three of the iteration. Dotted line is the laser trajectory, which is computer driven by rotating the mirror.

Figure 14:
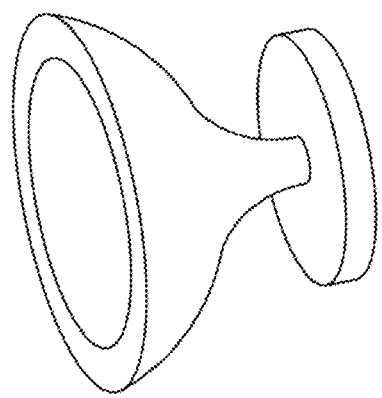
Figure 15:
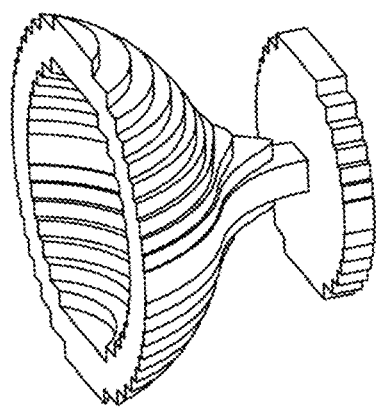

A naïve approach to simulate the process in a CAD system (and from which the method of FIG. 1 departs) would be to represent each layer of material by a thin solid and to combine these solids using traditional Boolean operations of the geometric modeler: union operation for instance (unite, add, merge are synonym for union in the CAD vocabulary). This operation outputs the solid resulting from the union of two input solids. FIG. 14 illustrates a virtual solid designed by using a CAD system. FIG. 15 illustrates the virtual shape of the same solid obtained by 3D printing. The slices' thicknesses are exaggerated for clarity. The method of FIG. 1 allows obtaining the B-Rep of the solid of FIG. 15 in a much faster way than the naïve approach.

Example implementations of the method of FIG. 1 are now discussed.

Geometrical Preliminaries

Before dealing with the overall process and the core of the invention, geometrical considerations are given. They explain the way manufacturing objects and operations are modeled by the geometry in order for the CAD system to perform computations.

Geometry of the Laser Trajectory

This section describes examples to get in a simple way the laser trajectories from the target solid.

The target solid is intersected by parallel and equidistant planes. Each intersection is a planar face. Within this planar face a dedicated process computes the appropriate trajectory of the laser. For each plane, the trajectory is made of isolated points, line segments, arcs of circles and combinations of such elements into open or close composite curves. Within the same plane, disconnected trajectories are allowed, meaning trajectories made of separate continuous pieces.

Figure 16:
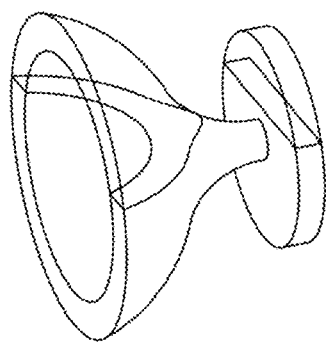
Figure 17:
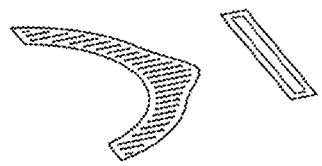
Figure 18:
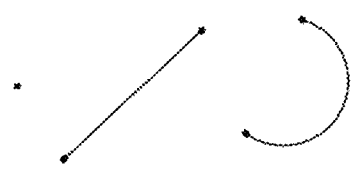
Figure 19:
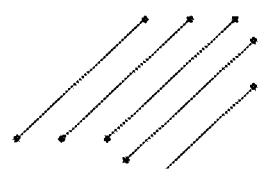
Figure 20:
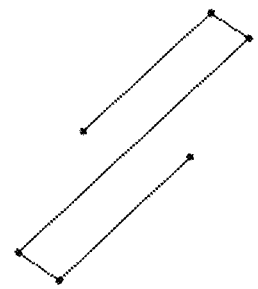
Figure 21:
Figure 22:
Figure 23:
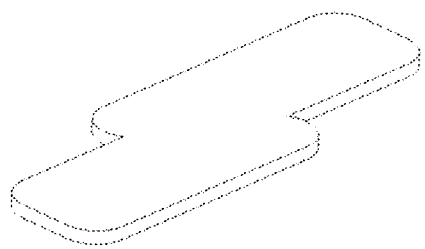
Figure 24:

FIG. 16 illustrates the target solid and its intersection curve with a plane. FIG. 17 illustrates the intersection curve and the laser trajectory (line segments). FIG. 18 illustrates basic elements for laser trajectory. FIGS. 19-20 illustrate typical trajectories.

Geometry of Fused Material

The geometry of the fused material at an isolated point where the laser hits the powder bed can be assimilated to a small cylinder. Its axis is perpendicular to the planar surface of the powder bed and its radius r and depth d depend on the laser power and on the powder type. Typical order of magnitude is $d \approx 0.05$ mm and $r \approx 0.05$ mm up to $r \approx 0.5$ mm. When the laser trajectory is made of line segments and arcs of circles, the geometry of the fused material can be assimilated to the swept volume defined by moving the center of the cylinder along the said line segments and arcs of circles. Whether it is continuous or not, the trajectory is such that the swept volume frequently overlaps. From the manufacturing point of view, this overlapping does not create a thicker solid material.

FIGS. 21-24 illustrate swept volumes associated with various trajectories.

The method of FIG. 1 does not compute the corresponding swept volumes, and thus avoids the complexity of sweeping solids. It provides the shape that is compliant with previous considerations, as explained in the following.

Algorithm to Compute Contours from Trajectories (i.e. Examples of S220)

Figures 25, 26, 27:
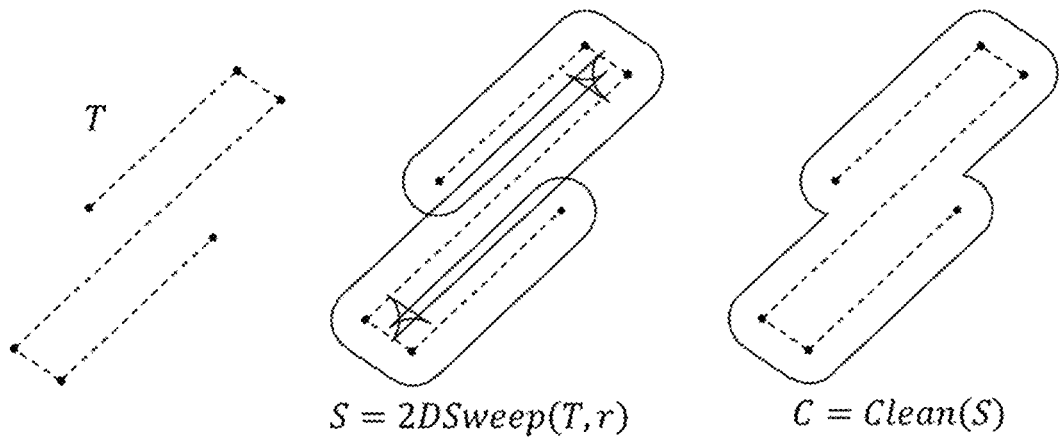

The input data are the planar laser trajectory T, as illustrated in FIG. 25, and the fusion radius r. Fusion depth d is not useful. In a first step, the offset trajectory is computed by sweeping radius r circle along trajectory T. The circle and the trajectory both belong to the same plane. This operation, noted S:=2DSweep(T,r), yields a self-intersecting curve S, as illustrated in FIG. 26. In a second step, irrelevant pieces of curve S are removed in order to get the clean boundary C of the swept circle, as illustrated in FIG. 27. This process is well known from state of the art. S220 can for example be performed according of the teaching of paper "In-Kwon Lee, Myung-Soo Kim, and Gershon Elber, *Planar Curve Offset Based on Circle Approximation*, Computer-Aided Design, Vol. 28, No. 8, pp. 617-630, August, 1996" or paper "Xu-Zheng Liu, Jun-Hai Yong, Guo-Qin Zheng, Jia-Guang Sun. *An offset algorithm for polyline curves*. Computers in Industry, Elsevier, 2007, 15p".

Example of the Overall Process

Figure 28:
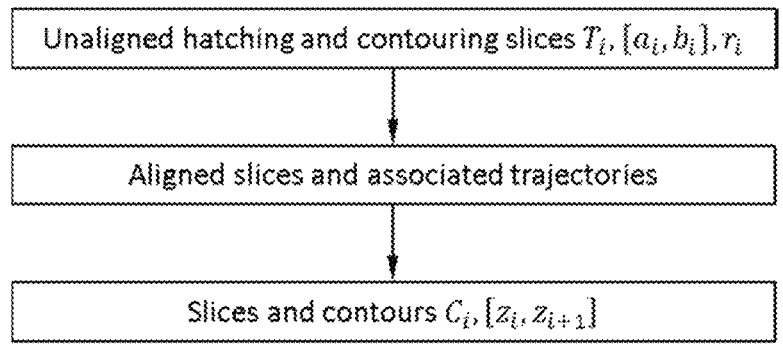
Figure 29:
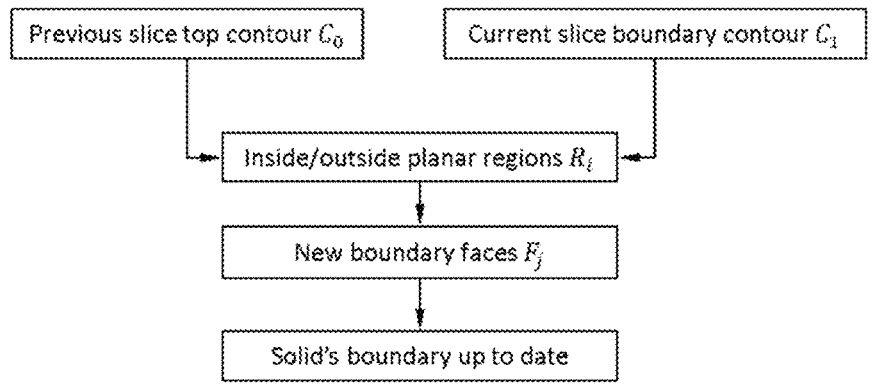

An example of the method of FIG. 1 illustrated by FIGS. 28-29 amounts to iteratively add the current slice on top of the previous slice. Repeating this process iteratively eventually yields the shape of the 3D printed solid.

Input data are the so-called hatching and contouring planar trajectories $T_i$, i=1, ..., n, respectively associated with a fusion radius $r_i$, a bottom limit $a_i$ and a top limit $b_i$. The fusion depth of trajectory $T_i$ is $d_i = b_i - a_i$. Roughly speaking, hatching slices are dedicated to print the inside of the target part and contouring slices are dedicated to print the boundary of the target part. Hatching and contouring slices are not horizontally aligned, meaning that $[a_i, b_i]$ intervals may overlap, and the first step of the method of the examples may be to provide aligned slices through mutual subdivision.

In a second step, the method may compute the boundary contour of each slice by using trajectories $T_i$ and fusion radius values $r_i$. This outputs a list of heights $z_1 < z_2 < \ldots < z_m$ and a contour $C_i$ associated with each interval $[z_i, z_{i+1}]$. Now, slices thicknesses are noted $t_i = z_{i+1} - z_i$ and they represent geometrical information rather than a fusion depth.

The method may then compute the geometry of the current slices and combine it on top of the previous slice. Input data are the current slice thickness $t_1$, the previous slice contour $C_0$, and the current slice contour $C_1$. The first step is to solve the planar topology defined by the previous slice top contour $C_0$ and the current slice contour $C_1$. This may be performed in a horizontal working plane and yields adjacent regions, noted $R_i$, i=1, ..., n, including the unbounded outside region.

The second step may be to create the boundary faces $F_j$, j=1, ..., m to be combined to the current solid in order to incorporate the current slice shape. The third and last step may be to replace top faces of the solid by faces $F_j$, which yields the new solid shape.

Examples of Aligning Hatching Data and Contouring Data

Depth fusion parameter d and radius fusion parameter r both depend on the laser's intensity. When printing the inside portion of the target part, which requires less precision, this intensity is higher in order to get thicker slices. This process is named hatching. Conversely, when printing slices closed to the boundary of the target part, which requires more precision, the intensity is reduced in order to get thinner slices. This process is named contouring. This strategy leads to a shorter manufacturing time while saving a precise final solid. From the geometrical point of view, hatching slices are not horizontally aligned. A hatching slice may overlap several contouring slices, as illustrated in FIG. 30 where the target shape is the dotted profile.

The method may rework hatching and contouring data in such a way that all slices are horizontally aligned. Overlapping slices may be mutually subdivided, as illustrated in FIG. 31.

An example algorithm for horizontal alignment is now described. The list of all hatching and contouring limits ($a_1$, $b_1$, $a_2$, $b_2$, ..., $a_n$, $b_n$) may be sorted into a list ($z_1$, $z_2$, ..., $z_m$) such that $z_1 < z_2 < \ldots < z_m$ with m<2n. Then, a list of trajectories may be associated with each interval $[z_i, z_{i+1}]$ as follows.

For each interval $[z_i, z_{i+1}]$
$$q := \frac{1}{2}(z_i + z_{i+1})$$

```
For each j ∈ {1, . . . , n} such that a_j < q < b_j do begin
    Associate trajectory T_j with interval [z_i, z_{i+1}]
    End for
End for
```

Examples of Computing Slices Contours

Now, a unique planar contour $C_i$ may be associated with each interval $[z_i, z_{i+1}]$. In the example algorithm below, notations S:=2DSweep(T,r) and C:=Clean(S) are previously explained. Notation $C_i \cup C$ refers to the boundary contour of the 2D Boolean operation of face bounded by contour $C_i$ and face bounded by contour C. Notation ø is the empty set.

```
For each interval [z_i,z_{i+1}] do begin
    C_i:=Ø
        For each trajectory T associated with
        interval [z_i,z_{i+1}] do begin
            r:= fusion radius associated with T
                S:=2DSweep(T,r)
                C:=Clean(S)
                C_i:=C_i ∪ C
        End for
End for
```

Now, the horizontally aligned slices are defined by contours $C_i$ respectively associated with intervals $[z_i,z_{i+1}]$ for i=1, . . . , m−1.

FIG. 32 illustrates the target solid and FIG. 33 illustrates the corresponding hatching and contouring slices. The hatching slice is associated with a trajectory $T_1$, limits $a_1,b_1$ and a hatching radius $r_H$, two contouring slices respectively associated with trajectory $T_2$, limits $a_2,b_2$ and $T_3$ limits $a_3,b_3$ with contouring radius $r_C$. The geometry is such that $a_1=a_2$, $b_2=a_3$ and $b_1=b_3$.

FIG. 34 illustrates the trajectories respectively associated with hatching and contouring slices. Slices are separated for clarity.

The sorting yields $z_1=a_1=a_2<z_2=b_2=a_3<z_3=b_1=b_3$ and the algorithm yields two aligned slices respectively associated with intervals $[z_1,z_2]$ and $[z_2,z_3]$. Trajectories $T_1$ and $T_2$ may be associated with intervals $[z_1,z_2]$. Trajectories $T_1$ and $T_3$ may be associated with intervals $[z_2,z_3]$. This is shown on FIG. 35

Figure 36:
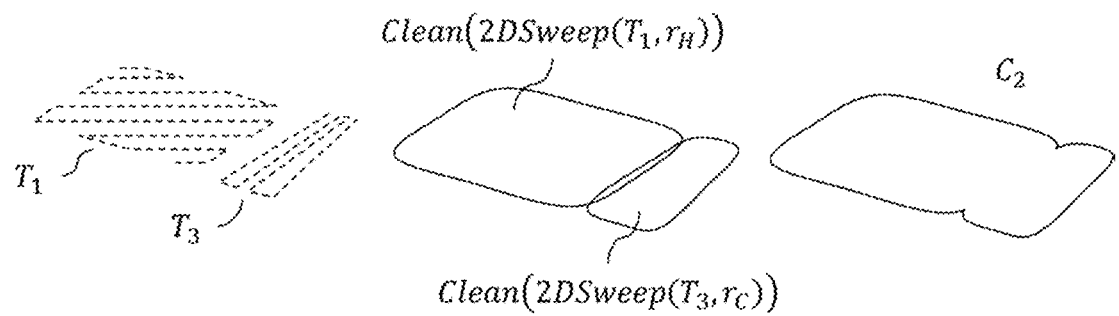

Then, the algorithm may yield contour $C_1$=Clean (2DSweep($T_2,r_C$))∪Clean (2DSweep($T_1,r_H$)) associated with interval $[z_1,z_2]$ and contour $C_2$=Clean (2DSweep($T_3$, $r_C$))∪Clean(2DSweep($T_1,r_H$)) associated with interval $[z_2, z_3]$. FIG. 36 illustrates how contour $C_2$ is obtained from $T_1$, $T_3$, $r_H$ and $r_C$.

Algorithm to Combine Two Slices Contours into a New Slice (i.e. Examples of S30)

In the examples now discussed, the portions of the planes that form the B-Rep comprise, for each plane $(z_{i+1})$ which is the second plane of a first couple of consecutive planes $([z_i,z_{i+1}])$ and the first plane of a second couple of consecutive planes $([z_{i+1},z_{i+2}])$, faces that each correspond to a respective region $(R_j)$ of the plane $(z_{i+1})$ which is outside the 2D contour $(C_i)$ respective to the first couple and inside the 2D contour $(C_{i+1})$ respective to the second couple, or which is inside the 2D contour $(C_i)$ respective to the first couple and outside the 2D contour $(C_{i+1})$ respective to the second couple. Also, each face that corresponds to a respective region $(R_j)$ of the plane $(z_{i+1})$ which is inside the 2D contour $(C_i)$ respective to the first couple and outside the 2D contour $(C_{i+1})$ respective to the second couple is set with an outer vector in a direction of the stack of planes, and each face that corresponds to a respective region $(R_j)$ of the plane $(z_{i+1})$ which is outside the 2D contour $(C_i)$ respective to the first couple and inside the 2D contour $(C_{i+1})$ respective to the second couple is set with an outer vector in a direction opposite to the direction of the stack of planes.

The following details these features of the discussed examples of the method of FIG. 1. The current solid is an incomplete stack of slices. Contour $C_0$ is the boundary curve of the top face of the uppermost slice. It can be made of several pieces. Contour $C_1$ is the boundary of next slice.

Figure 37:
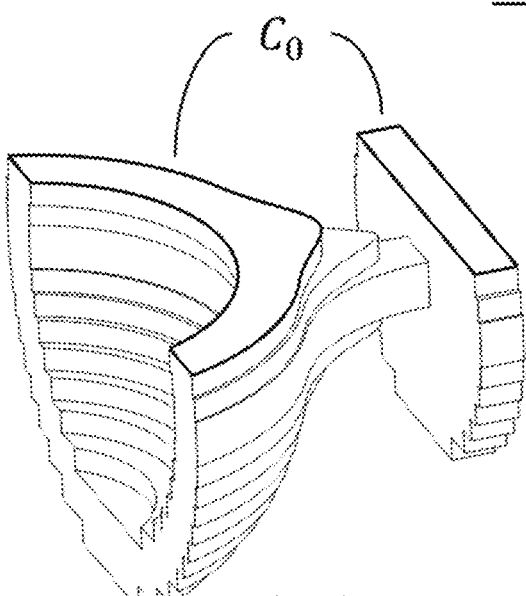
Figure 38:
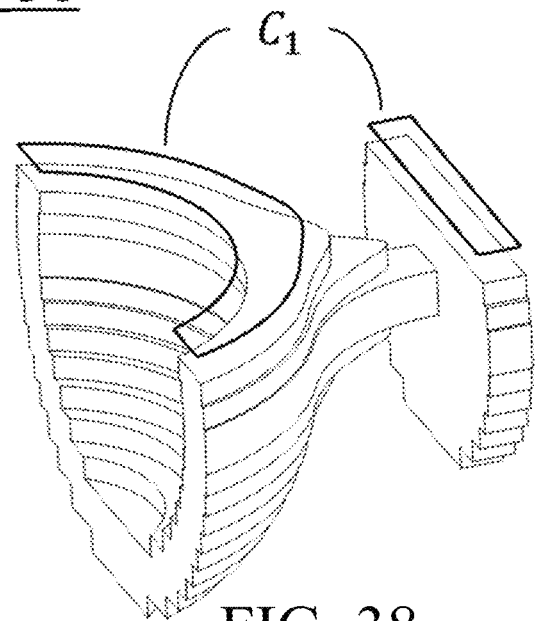
Figure 39:
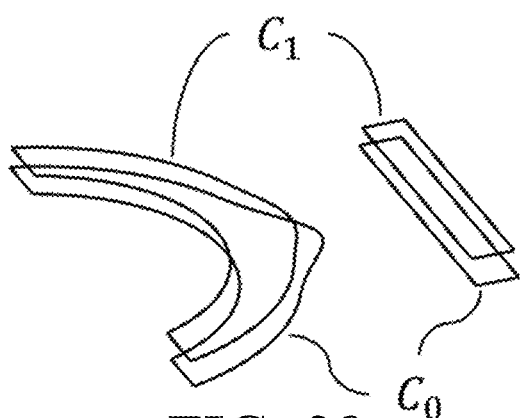
Figure 40:
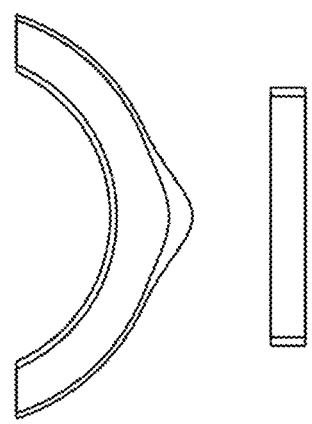

Shapes and positions of the solid and contours $C_0$, $C_1$ are illustrated in FIGS. 37-38. FIG. 39 illustrates the perspective view of contours $C_0$ and $C_1$. FIG. 40 illustrates contours $C_0$ and $C_1$ projected onto a working plane that is parallel to the slices.

Figure 41:
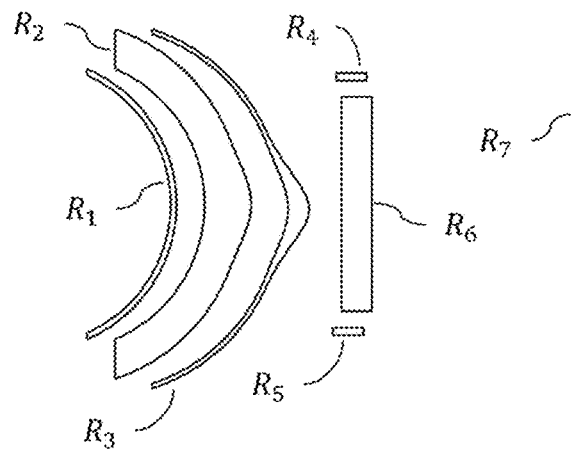

Projected contours separate the working plane into adjacent regions, including the infinite outer region. In the example, (projected) contours $C_0$ and $C_1$ separate the (working) plane into seven regions $R_1$, . . . , $R_7$ as illustrated in FIG. 41. Adjacent regions are separated for clarity.

Each region is either inside the other contour, outside the other contour, inside both contours or outside both contours. Next table gathers the inside/outside status of example regions.

|  | Inside $C_1$ | Outside $C_1$ |
|---|---|---|
| Inside $C_0$ | $R_2 R_6$ | $R_3 R_4 R_5$ |
| Outside $C_0$ | $R_1$ | $R_7$ |

A goal may now be to build faces based on previous contours and regions in such a way that the updated shape of the solid can be obtained. No surface/surface intersection is needed. In other words, surface/surface intersection may be excluded by the method. Three types of faces may be created: bottom faces, side faces and top faces. All these faces may define the topology of the current slice.

Bottom faces may be defined by:
  regions that are outside $C_0$ and inside $C_1$ and they are set with a downward outer normal vector,
  regions that are inside $C_0$ and outside $C_1$ and they are set with an upward outer normal vector.

Side faces may be obtained by a downward extrusion of contour $C_1$ with depth d. A horizontal outer normal vector is associated with side faces. Finally, top faces are defined by contour $C_1$ associated with an upward outer normal vector.

Figure 42:
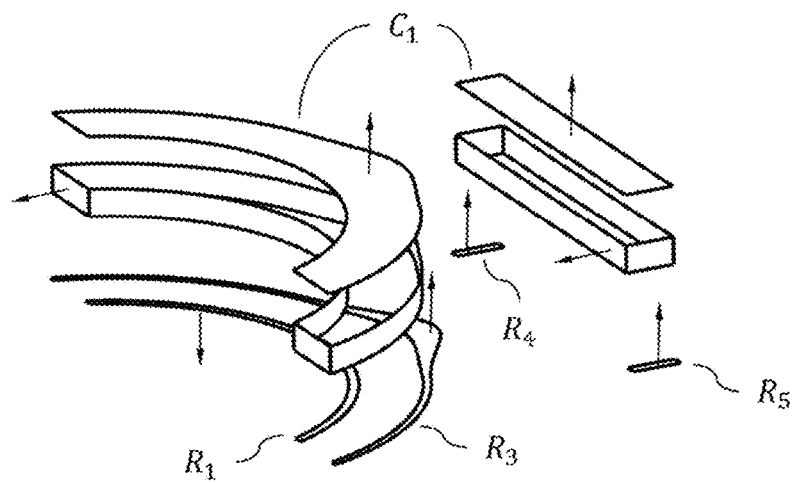
Figure 43:
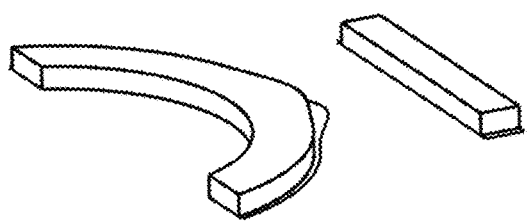
Figure 44:
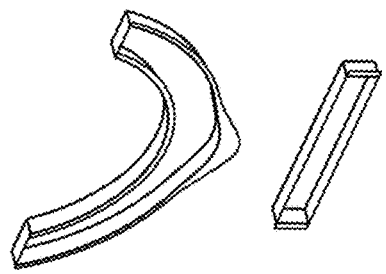

FIG. 42 illustrates the fourteen current slice faces $F_j$ of the example. Four bottom faces (obtained with regions $R_1$, $R_3$, $R_4$ and $R_5$) two top faces (obtained with contour $C_1$) and eight side faces (obtained by extruding contour $C_1$). They are separated for clarity. Notice the downward normal vector of face $R_1$. This represents a small step underneath the current slice. FIGS. 43-44 illustrate the open skin that defines the current slice. Two perspective views are provided for clarity.

The very last step of these example implementations of FIG. 1 may be to remove from the solid all top faces of previous slice (these are faces bounded by contour $C_0$) and to fill the opening with the skin of the current slice. The resulting topology is closed by design.

Figure 45:
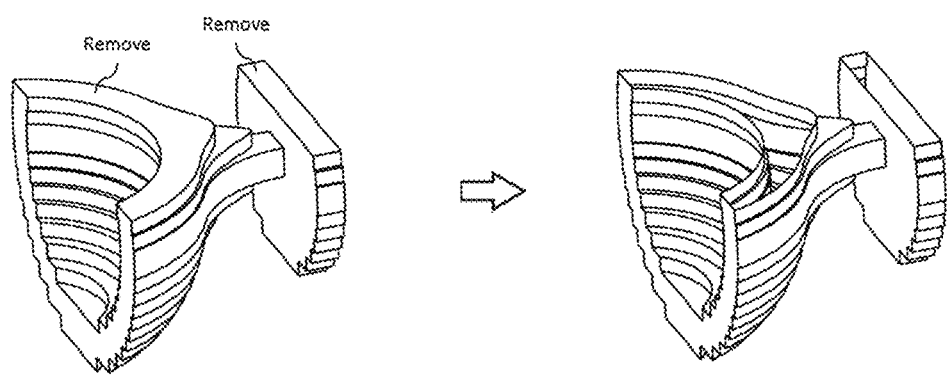
Figure 46:
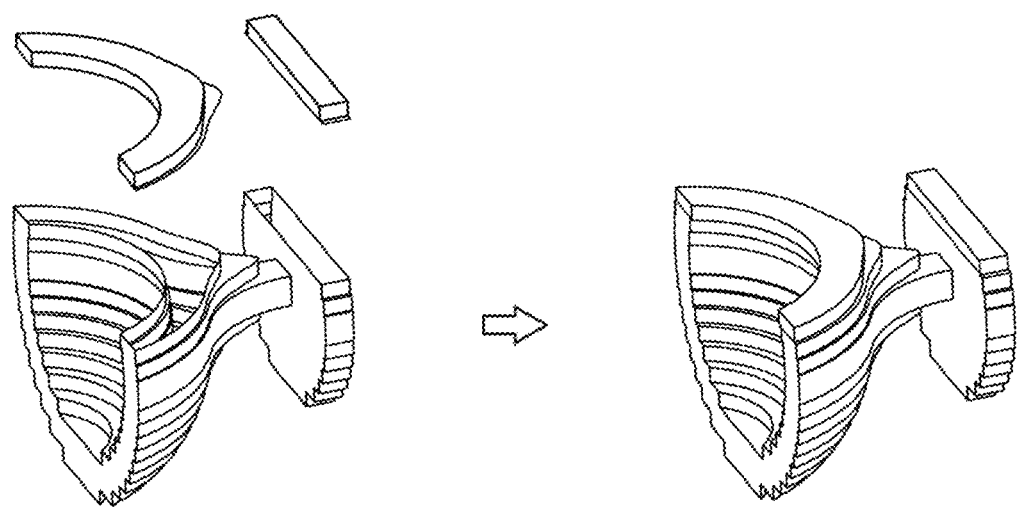

FIG. 45 illustrates the opening of the solid by removing previous slice top faces. FIG. 46 illustrates the sewing of current slice skin on the solid's skin. It must be understood that this operation is not a traditional Boolean union of solids. It is a sewing of faces, which, from the computational point of view, is a topological graph rewriting that only involves light logical operations as opposed to heavy geometrical operations.

The invention claimed is:

1. A computer-implemented method for determining a boundary representation of a result of a two-axis 3D printing process, the method comprising:
    obtaining a stack of planes $((0, z\_1, z\_2, \ldots, z\_m))$, each couple of consecutive planes $([z\_i, z\_(i+1)])$ corresponding to a respective slice of the result of the 3D printing process; and
    for each couple of consecutive planes $([z\_i, z\_(i+1)])$:
        obtaining one or more respective tool trajectories $(T\_i)$,
        determining a respective 2D contour $(C\_i)$ corresponding to the one or more tool trajectories,
        determining a respective extrusion of the respective 2D contour bounded by a second plane $(z\_(i+1))$ of the couple and a first plane $(z\_i)$ of the couple, and
        forming the boundary representation with the extrusions and portions $(R\_j)$ of the planes,
    wherein the portions of the planes that form the boundary representation comprise, for each plane $(z\_(i+1))$ which is the second plane of a first couple of consecutive planes $([z\_i, z\_(i+1)])$ and the first plane of a second couple of consecutive planes $([z\_(i+1), z\_(i+2)])$, faces that each correspond to a respective region $(R\_j)$ of the plane $(z\_(i+1))$ which is outside the 2D contour $(C\_i)$ respective to the first couple and inside the 2D contour $(C\_(i+1))$ respective to the second couple, or which is inside the 2D contour $(C\_i)$ respective to the first couple and outside the 2D contour $(C\_(i+1))$ respective to the second couple, and
    wherein each face that corresponds to a respective region $(R\_j)$ of the plane $(z\_(i+1))$ which is inside the 2D contour $(C\_i)$ respective to the first couple and outside the 2D contour $(C\_(i+1))$ respective to the second couple is set with an outer vector in a direction of the stack of planes, and each face that corresponds to a respective region $(R\_j)$ of the plane $(z\_(i+1))$ which is outside the 2D contour $(C\_i)$ respective to the first couple and inside the 2D contour $(C\_(i+))$ respective to the second couple is set with an outer vector in a direction opposite to the direction of the stack of planes.

2. The method of claim 1, wherein obtaining the stack of planes $((0, z\_1, z\_2, \ldots, z\_m))$ further comprises:
    obtaining a sequence of tool trajectories and for each tool trajectory a respective pair of layer limits; and
    determining the stack of planes from the sequence of tool trajectories and layer limits.

3. The method of claim 2, wherein determining the stack of planes further comprises:
    determining a set of all plane limits $(a\_1, b\_1, a\_2, b\_2, \ldots, a\_n, b\_n)$ from the layer limits; and
    sorting the set of all plane limits $(a\_1, b\_1, a\_2, b\_2, \ldots, a\_n, b\_n)$ into a strictly progressive list $(\{0<z\}\_1<z\_2<\ldots<z\_m)$.

4. The method of claim 1, wherein the method further comprises an analysis of the boundary representation formed with the extrusions and the portions of the planes.

5. The method of claim 4, further comprising:
    prior to the obtaining of the stack of planes, obtaining a 3D modeled object representing a reference product, the stack of planes and the one or more tool trajectories respective to each couple of consecutive planes being obtained based on the 3D modeled object representing the reference product, the analysis comprising a comparison between the boundary representation formed with the extrusions and the portions of the planes and the boundary representation of a reference product representing the reference product.

6. The method of claim 4, wherein the analysis further comprises a micro-crack and/or clash detection and/or a physical analysis.

7. The method of claim 1, further comprising:
    performing one or more boundary representation design operations on the boundary representation formed with the extrusions and the portions of the planes.

8. The method of claim 1, further comprising
    real-time displaying and/or streaming of the boundary representation, which is formed with the extrusions and the portions of the planes.

9. The method of claim 1, further comprising:
    adding to the boundary representation formed with the extrusions and the portions of the planes one or more attributes related to the two-axis 3D printing process.

10. The method of claim 1, further comprising:
    applying the two-axis 3D printing process to manufacture a product represented by the boundary representation.

11. A non-transitory data storage medium having recorded thereon a computer program comprising instructions for performing a computer-implemented method for determining a boundary representation of a result of a two-axis 3D printing process, the method comprising:
    obtaining a stack of planes, each couple of consecutive planes corresponding to a respective slice of the result of the 3D printing process; and
    for each couple of consecutive planes:
        obtaining one or more respective tool trajectories,
        determining a respective 2D contour corresponding to the one or more tool trajectories,
        determining a respective extrusion of the respective 2D contour bounded by a second plane of the couple and a first plane of the couple, and
        forming the boundary representation with the extrusions and portions of the planes,
    wherein the portions of the planes that form the boundary representation comprise, for each plane which is the second plane of a first couple of consecutive planes and the first plane of a second couple of consecutive planes, faces that each correspond to a respective region of the plane which is outside the 2D contour respective to the first couple and inside the 2D contour respective to the second couple, or which is inside the 2D contour respective to the first couple and outside the 2D contour respective to the second couple, and
    wherein each face that corresponds to a respective region of the plane which is inside the 2D contour respective to the first couple and outside the 2D contour respective to the second couple is set with an outer vector in a direction of the stack of planes, and each face that corresponds to a respective region of the plane which is outside the 2D contour respective to the first couple and inside the 2D contour respective to the second couple is set with an outer vector in a direction opposite to the direction of the stack of planes.

12. The non-transitory data storage medium of claim 11, wherein obtaining the stack of planes further comprises:

obtaining a sequence of tool trajectories and for each tool trajectory a respective pair of layer limits; and determining the stack of planes from the sequence of tool trajectories and layer limits.

13. A system comprising:

a processor coupled to a memory, the memory having recorded thereon a computer program comprising instructions for performing a computer-implemented method for determining a boundary representation of the result of a two-axis 3D printing process, the instructions when executed by the processor cause the processor to be configured to:

obtain a stack of planes, each couple of consecutive planes corresponding to a respective slice of the result of the 3D printing process, and for each couple of consecutive planes:
obtain one or more respective tool trajectories,
determine a respective 2D contour corresponding to the one or more tool trajectories,
determine a respective extrusion of the respective 2D contour bounded by a second plane of the couple and a first plane of the couple, and
form the boundary representation with the extrusions and portions of the planes, wherein the portions of the planes that form the boundary representation comprise, for each plane which is the second plane of a first couple of consecutive planes and the first plane of a second couple of consecutive planes, faces that each correspond to a respective region of the plane which is outside the 2D contour respective to the first couple and inside the 2D contour respective to the second couple, or which is inside the 2D contour respective to the first couple and outside the 2D contour respective to the second couple, and wherein each face that corresponds to a respective region of the plane which is inside the 2D contour respective to the first couple and outside the 2D contour respective to the second couple is set with an outer vector in a direction of the stack of planes, and each face that corresponds to a respective region of the plane which is outside the 2D contour respective to the first couple and inside the 2D contour respective to the second couple is set with an outer vector in a direction opposite to the direction of the stack of planes.

14. The system of claim 13, wherein the processor is further configured to obtain the stack of planes by being further configured to:

obtain a sequence of tool trajectories and for each tool trajectory a respective pair of layer limits, and determine the stack of planes from the sequence of tool trajectories and layer limits.

\* \* \* \* \*